No. 850,247. PATENTED APR. 16, 1907.
O. PETRI.
REVERSIBLE TRANSMISSION GEAR.
APPLICATION FILED JULY 17, 1905.
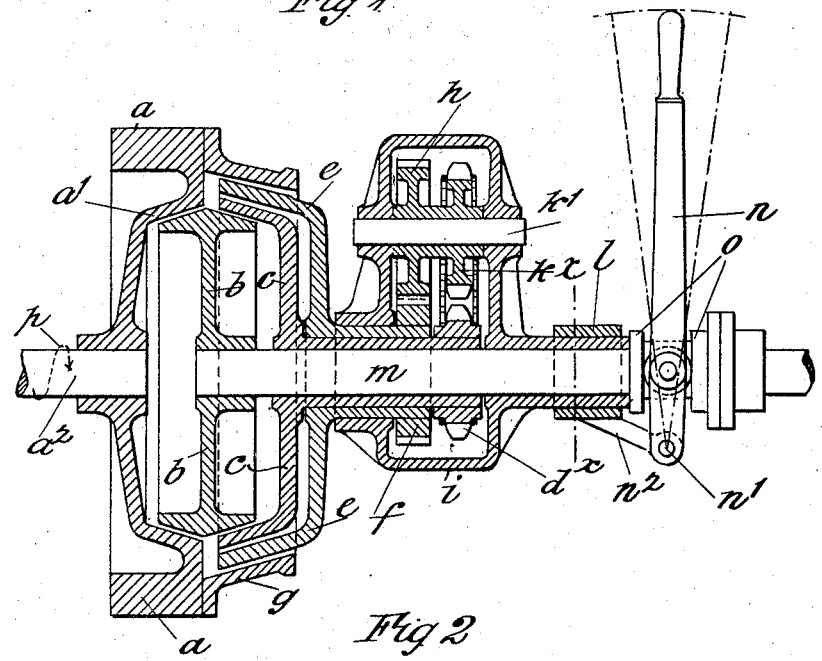
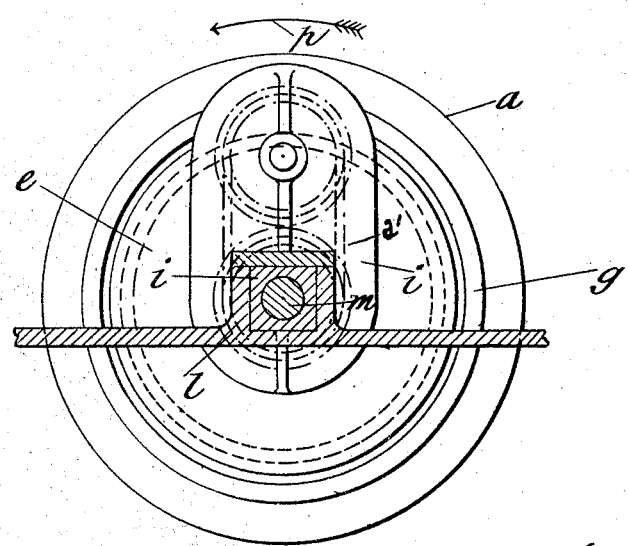
Witnesses
A. J. Madden
H. Pausch
Inventor
Otto Petri
by his Attorney

UNITED STATES PATENT OFFICE.

OTTO PETRI, OF STUTTGART, GERMANY.

REVERSIBLE TRANSMISSION-GEAR.

No. 850,247.

Specification of Letters Patent.

Patented April 16, 1907.

Application filed July 17, 1905. Serial No. 270,072.

*To all whom it may concern:*

Be it known that I, OTTO PETRI, a subject of the German Emperor, residing at Stuttgart, in Germany, have invented certain new and useful Improvements in Reversible Transmission-Gear, of which the following is a specification.

This invention relates to improvements in reversible transmission-gear for use in connection with non-reversible motors, engines, and the like.

The improved transmission-gear comprises two shafts placed in alinement with each other, one of the said shafts being adapted to drive the other, either by means of a friction-clutch alone or by means of a clutch and gear-wheels, by which latter the direction of rotation is reversed.

The essential feature of the invention consists in the fact that when the reversing-gear is not in action the box containing the said gear is entirely disconnected from the driving mechanism, so that the reversing-gear remains at rest.

The invention is illustrated in the annexed drawings, in which—

Figure 1 is a longitudinal section of the transmission-gear, and Fig. 2 a cross-section on the line $x\,x$ of Fig. 1.

In the form of construction illustrated a series of conical clutch members are used for transmitting the rotation.

$a$ is a fly-wheel mounted on a shaft $a^2$, which is uniformly driven in the direction indicated in Figs. 1 and 2 by arrows $p$.

$b$ is an interior clutch member fixed to the shaft $m$, to which the rotation of the fly-wheel $a$ is to be transmitted.

$c$ is an intermediate clutch member rotatable on the shaft $m$ and adapted to coöperate with the clutch member $b$. The hub of the intermediate clutch member $c$ extends into a box $i$, which contains an oil-bath and is longitudinally movable, but not rotatable, in a bearing $l$. Within the box $i$ a sprocket-wheel $d$ is fixed to the hub of the clutch member $c$, and a sprocket-wheel $k$, which is connected with the sprocket-wheel $d$ by means of a chain $d'$, is mounted on an axle $k'$, which has bearings in the box $i$. An outer clutch member $e$ is mounted on the hub of the clutch member $c$, and a toothed wheel $f$, situated within the box $i$, is rigidly connected with the hub of said clutch member $c$. A toothed wheel $h$, integral with the sprocket-wheel $k$, meshes with the toothed wheel $f$. The clutch member $e$ is adapted to coöperate with a clutch-surface $g$, fixed to the fly-wheel $a$, the latter being, moreover, provided with an interior clutch-surface $a'$, adapted to coöperate with the clutch member $b$ aforesaid.

The box $i$ and shaft $m$ are adapted to be longitudinally displaced by means of a lever $n$, situated between two collars $o$, formed on the said shaft and pivoted at $n'$ to an arm $n^2$, attached to bearing $l$. In the drawings the transmission-gear is shown in the "off" position, in which the lever $n$ occupies the central position H. When this lever is moved from the central position H into the "reversing" position R, (indicated by a dot-and-dash line,) the clutch member $b$ is first brought into contact with the clutch member $c$, and the parts $b$ and $c$, with the box $i$, are then displaced toward the right, so that the clutch member $e$ is brought into contact with the part $g$ and is thus caused to revolve by the fly-wheel $a$. The rotation of the member $e$ is reversed by the gear-wheels $f$ and $h$ and transmitted, by means of the sprocket-wheels $k$ and $d$ and chain $d'$, to the clutch members $c$ and $b$, by which the shaft $m$ is thus driven in the direction opposite to that indicated by the arrows $p$. By moving the lever $n$ from the reversing position R to the normal working position V the clutch member $e$ is moved out of contact with the part $g$ and the clutch member $b$ is moved into contact with the interior clutch-surface of the fly-wheel $a$, so that the shaft $m$ is directly driven by the latter and the reversing-gear is entirely disconnected from the driving-shaft.

I claim—

In reversible transmission-gear the combination with a driving-shaft and a driven shaft of a fly-wheel having two clutch-surfaces driven in one direction by said driving-shaft, an interior clutch member rigidly mounted on the driven shaft and adapted to coöperate with one of said clutch-surfaces, an intermediate clutch member loosely mounted on said driven shaft and adapted to coöperate with said interior clutch member, an outer clutch member mounted on said intermediate member and adapted to coöperate with the other said clutch-surface, spur-and-sprocket gearing between the outer and termediate members for rotating the latter member in the opposite direction and adapted to be disconnected from the driving-shaft when out of action, a casing containing said gearing and means for throwing the various clutch members into and out of operation, substantially as described.

In witness whereof I have signed this specification in the presence of two witnesses.

OTTO PETRI.

Witnesses:
 JULIUS GLASS,
 ERNST ENTENMANN.